Feb. 24, 1942.  J. B. SHEERER  2,274,097
CRANKLESS ENGINE
Filed Oct. 27, 1938   3 Sheets-Sheet 1

John B. Sheerer, INVENTOR

Feb. 24, 1942.    J. B. SHEERER    2,274,097
CRANKLESS ENGINE
Filed Oct. 27, 1938    3 Sheets-Sheet 2

John B. Sheerer,
INVENTOR

Feb. 24, 1942.   J. B. SHEERER   2,274,097
CRANKLESS ENGINE
Filed Oct. 27, 1938   3 Sheets-Sheet 3

John B. Sheerer, INVENTOR

BY *Victor J. Evans & Co.* ATTORNEYS

*P. J. Hickey.* WITNESS

Patented Feb. 24, 1942

2,274,097

UNITED STATES PATENT OFFICE 2,274,097

CRANKLESS ENGINE

John B. Sheerer, Pittsburgh, Pa.

Application October 27, 1938, Serial No. 237,346

1 Claim. (Cl. 123—58)

This invention relates to crankless engines and has for an object to provide an engine of the internal combustion two-cycle type in which the compression stroke of the pistons is augmented by electro-magnetic means.

A further object is to provide an engine of this type in which parallel pistons are spaced around a shaft and rotate a circular cam plate for driving the shaft, the cam plate having a novel groove provided with straight portions intermediate curved portions, the wrist pins riding in the straight portions at the ends of stroke so that no jar or shock will result as would be the case were the groove devoid of such straight portions.

A further object is to provide an engine of this type, having a rotor in the muffler driven by the spent gases and connected to the shaft for utilizing the velocity of the exhaust gases to produce power.

A further object is to provide an engine of this type which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1:
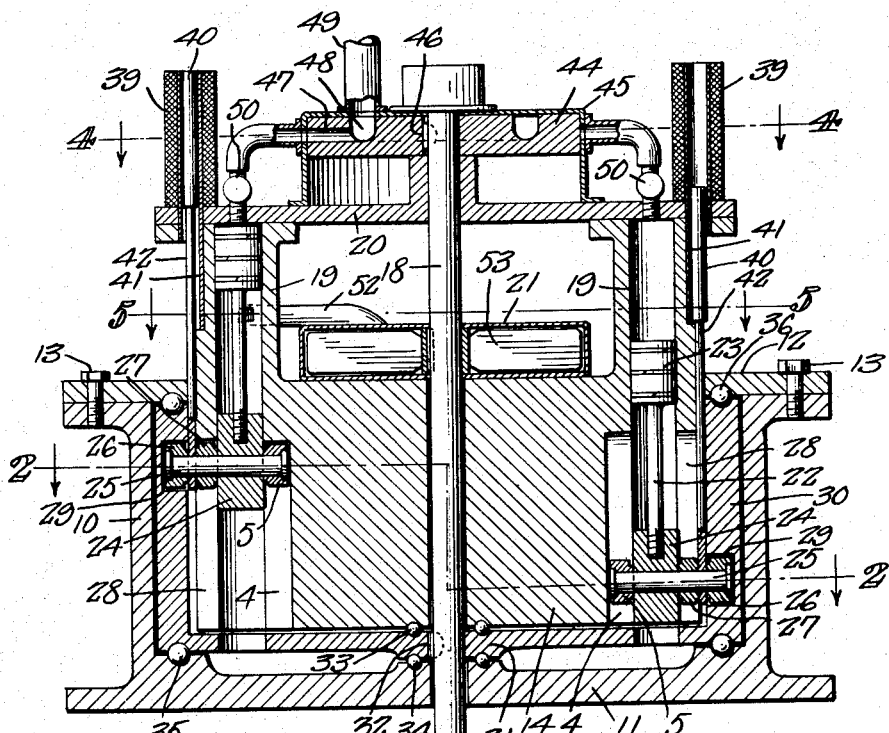
Figure 1 is a longitudinal sectional view of an engine constructed in accordance with the invention.

Referring now to the drawings in which like characters of reference designate similar parts in the various views, 10 designates a cylindrical casing, the casing being formed integral with the bed plate 11 and having an annular cover plate 12 secured to the top thereof through the medium of bolts 13.

Figure 2:
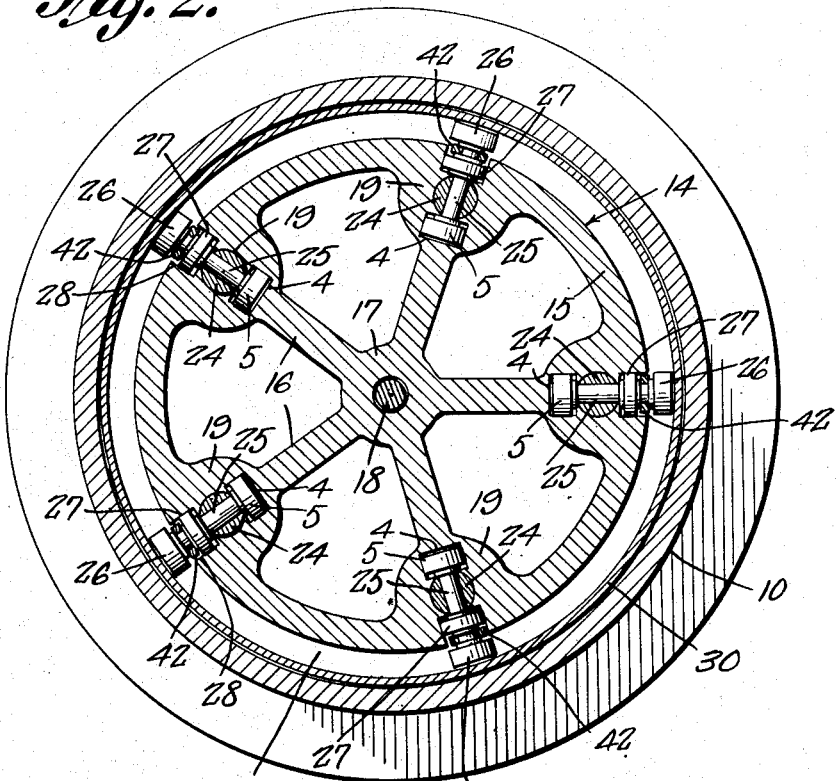
Figure 2 is a cross sectional view taken on the line 2—2 of Figure 1 and showing the wrist pins of the cross-heads connected with the circular cam plate.

As best shown in Figure 2 a stationary frame 14 is concentrically disposed in the casing and comprises a cylindrical wall 15, webs 16 which radiate from the wall, and a central hub 17 in which the engine shaft 18 is vertically mounted, as best shown in Figure 1. The cylindrical wall 14 is provided with preferably five angularly spaced cylinders 19 which are closed at the top through the medium of the cylinder head 20, common to all the cylinders and spaced above the webs 16 to provide a space within the cylindrical wall of the frame to receive a muffler 21 which will be later described.

The piston rod 22 of the piston 23 in each cylinder is provided at the bottom with a cross head 24 which nicely fits in the cylinder. A wrist pin 25 projects laterally from the cross head and is equipped with three spaced rollers 26, 27, and 5.

Figure 3:
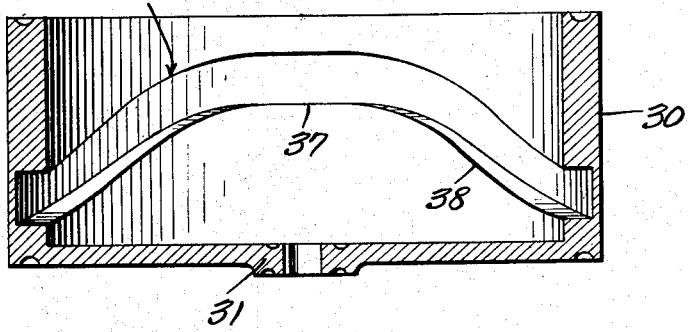
Figure 3 is a longitudinal sectional view of the circular cam plate.

The intermediate roller 27 of each wrist pin reciprocates vertically in a guide groove 28 formed in the respective cylindrical wall. The outermost roller 26 of each wrist pin is fitted in the cam slot 29 of a circular cam plate 30 forming a rotor, best shown in Figure 3. The innermost roller reciprocates in a vertical guide groove 4 formed in the respective cross head guide walls opposite the guide groove 28 as shown in Figure 2. The cam plate is provided on the bottom with a hub 31 which is keyed to the shaft 18, as shown at 32 in Figure 1. Between the bottom of the cam plate and hub 17 of the stationary frame ball bearings 33 are disposed and similar ball bearings 34 are disposed between the hub of the bottom plate and the bed plate 11 of the cylindrical casing 10 to reduce friction. For a similar reason ball bearings 35 and 36 are disposed respectively between the cover plate 12 and cylindrical wall of the frame.

Figure 6:
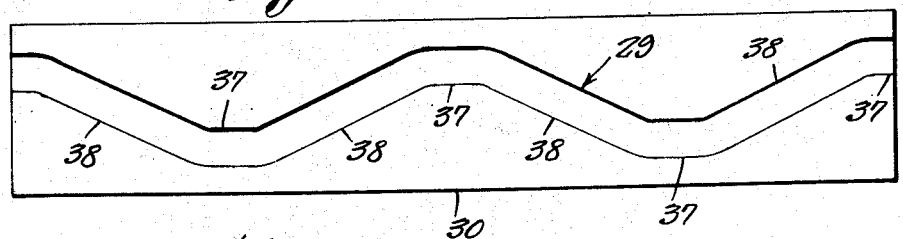
Figure 6 is a diagrammatic view showing the alternate flat and angular portions of the slot in the circular cam plate connected with the proper curves.

By referring to Figure 6 it will be seen that the slot 29 is provided with alternate horizontal rectilinear portions 37 and angular portions 38. The wrist pins 25 ride in the angular portions to impart rotation to the cam plate during reciprocatory movement of the pistons while at the ends of stroke the wrist pins ride in the straight portions 37 so that the pistons will be carried without shock or jar as they change direction while at the same time there will be no impairment of the speed of the cam plate.

To expedite the compression stroke of the pistons, operating on the two-cycle principle, a plurality of solenoids 39, equal in number to the number of pistons, are arranged on the common piston head 20, as shown in Figure 1, and are provided with respective cores 40 which extend downwardly upon the outer face of the cylindrical wall 15 of the frame 14 and are guided in their movements through the medium of non-magnetic guides 41. Each core is provided with a rod 42 which is connected to the wrist pin 25 of a respective piston between the two rollers 26 and 27 as best shown in Figure 1. The solenoid may be connected to any suitable source of current and are timed to be energized alternately with the spark plug 43 of the respective cylinder so that the core will be drawn into the solenoid as the piston has completed its power stroke and begins the compression stroke.

Figure 4:
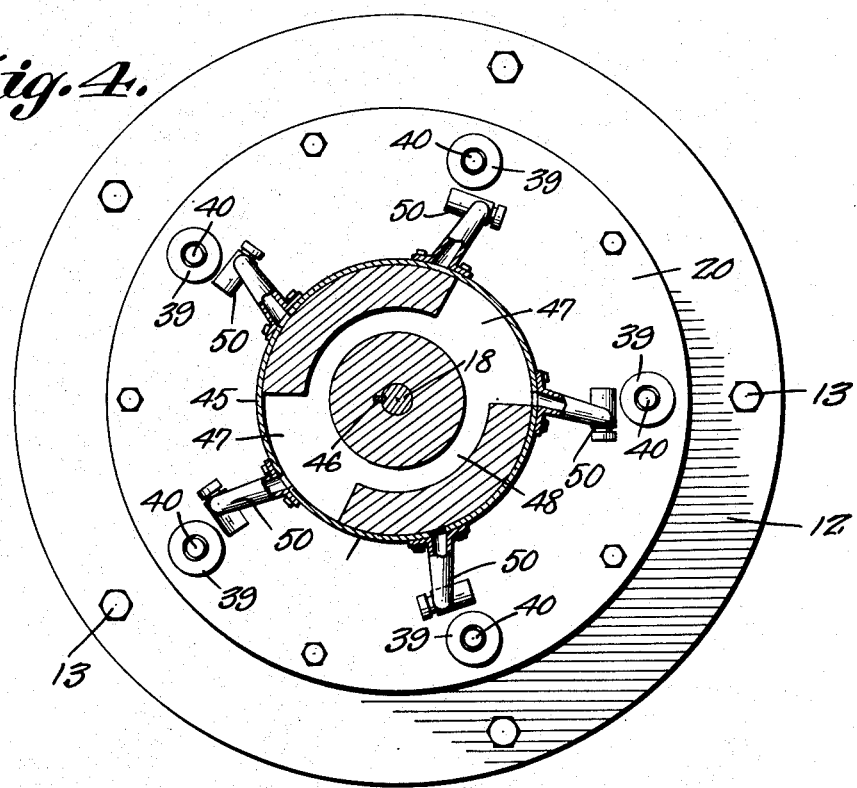
Figure 4 is a cross sectional view taken on the line 4—4 of Figure 1 showing the solenoids in top plan with parts being broken away and showing the rotary valve for distributing a compressed mixture to the cylinders.

As best shown in Figure 4, a rotary fuel valve 44 is mounted in a valve casing 45 secured to the piston head 20 and is keyed to the shaft 18, as shown at 46. The valve is provided with two oppositely disposed ports 47 which supply a combustible mixture to a pair of the cylinders almost simultaneously, the ports being arranged to supply the mixture to one of these two or all cylinders at a one-tenth lead over the other cylinder so that smoothness in operation will be promoted. An annular groove 48 is formed in the valve concentric with the ports 47 and communicates with a pipe 49 which leads to a compressor of conventional type for supplying a compressed mixture to the valve.

Figure 7:
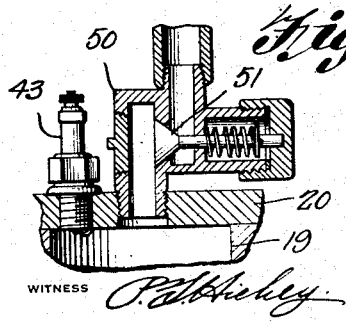
Figure 7 is a detail sectional view showing one of the fuel check valves and a spark plug.

Each cylinder is provided with an inlet pipe 50, best shown in Figure 7, having a check valve 51 adapted to open when charging valve opens the port to charge the cylinder and supply a fresh charge to be fired when the piston arrives at its proper point of stroke.

Figure 5:
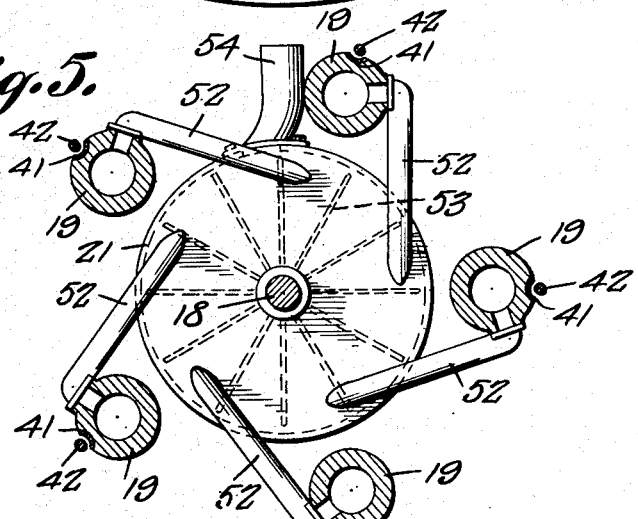
Figure 5 is a cross sectional view taken on the line 5—5 of Figure 1 and showing the rotor in the muffler.

The cylinders are provided with respective exhaust pipes 52 at a slightly less distance below the head 20 than the stroke of a piston. These exhaust pipes are connected with the beforementioned muffler 21 which is arranged concentrically with respect to the shaft 18. A rotor 53 is keyed to the shaft 18 within the muffler and the exhaust pipes 52 enter the head of the muffler at such an angular inclination with respect to the blades of the rotor, that, as shown by the arrowheads in Figure 5, rotation will be imparted to the rotor by pressure of the used gases thereagainst to utilize these gases to assist rotation of the power take-off shaft 18.

The spent gases find their way to the atmosphere through which pipes 54 communicate with ports in the wall of the muffler 21.

The firing of the cylinders is timed through the medium of a conventional timer 55 which is suitably connected to one end of the shaft 18. This timer may be combined with the timer for actuating the solenoids by simply placing the stationary switch contacts for the solenoids intermediate the stationary contacts of the conventional ignition switch contacts of the timer.

Since the operation has been described as the description of the parts progressed it is thought that the invention will be fully understood without further explanation.

What is claimed is:

In a two cycle crankless explosive engine a stationary cylindrical casing, a bed plate integral with the bottom of the casing, an annular cover plate secured to the top of the casing, a cylindrical stationary frame wall concentrically disposed in the casing within the inner periphery of the cover plate and extending above the cover plate, radially disposed webs integral with the wall below the cover plate, a hub connecting the webs, a vertically disposed shaft projecting at both ends through the hub, an annular series of cylinders in the wall above and outside of the webs and disposed parallel with the shaft, a cylinder head closing the top of all of the cylinders and spaced above said webs to provide a muffler space in the engine above the webs, exhaust pipes connected to the cylinders entering said space, pistons for the cylinders, a cylindrical rotary cam disposed concentric with the shaft between the casing and the frame wall of substantially the height of the casing, there being an undulating cam groove on the inner periphery of the cam plate, piston rods for the pistons extending downward along said webs, wrist pins carried by the piston rods engaged in said cam groove at one end and engaged in guide grooves in the webs at the opposite end, a bottom for the cam plate integral with the cam plate and disposed on said bed plate, said bottom having a hub keyed to said shaft, reciprocation of the pistons rotating the cam plate and shaft as a unit through the medium of said wrist pins, a rotary fuel supply valve fixed to the shaft above said cylinder head, oppositely disposed ports on the valve, and check valve control fuel pipes connected to the cylinder and adapted to register with said ports during rotation of the fuel supply valve.

JOHN B. SHEERER.